United States Patent [19]

Hedtke et al.

[11] Patent Number: 4,907,181
[45] Date of Patent: Mar. 6, 1990

[54] TEST AND MONITORING SYSTEM FOR A DIGITAL VIDEO TAPE RECORDER/REPRODUCER

[75] Inventors: Rolf Hedtke, Darmstadt-Eberstadt; Rolf Loos, Münster; Roland Mester; Jürgen Hänsel, both of Darmstadt, all of Fed. Rep. of Germany

[73] Assignee: Robert Bosch GmbH, Stuttgart, Fed. Rep. of Germany

[21] Appl. No.: 204,194

[22] Filed: Jun. 8, 1988

[30] Foreign Application Priority Data

Jun. 11, 1987 [DE] Fed. Rep. of Germany ....... 3719498

[51] Int. Cl.$^4$ .......................... G06F 11/00; G11B 5/09
[52] U.S. Cl. .................................. 364/579; 371/50.1; 360/32; 358/327; 358/139; 358/10
[58] Field of Search .......................... 371/38, 50, 1, 39; 364/579, 200, 900; 360/32, 19.1; 340/825.16; 358/10, 139, 327

[56] References Cited

U.S. PATENT DOCUMENTS

| | | | |
|---|---|---|---|
| 4,205,324 | 5/1980 | Patel | 371/50 |
| 4,206,440 | 6/1980 | Doi et al. | 371/39 |
| 4,211,997 | 7/1980 | Rudnick et al. | 371/38 |
| 4,357,702 | 11/1982 | Chase et al. | 371/1 |
| 4,538,268 | 8/1985 | Pham Van Cang | 364/579 |
| 4,564,945 | 1/1986 | Glover et al. | 371/38 |
| 4,635,259 | 1/1987 | Schinabeck et al. | 364/579 |
| 4,730,321 | 3/1988 | Machado | 371/38 |
| 4,742,519 | 5/1988 | Abe et al. | 371/38 |
| 4,799,113 | 1/1989 | Murakami | 360/32 |

Primary Examiner—Parshotam S. Lall
Assistant Examiner—V. Trans
Attorney, Agent, or Firm—Frishauf, Holtz, Goodman & Woodward

[57] ABSTRACT

A system for testing and/or monitoring a digital videotape apparatus makes use of the presence several identically equipped recording and reproducing channels to detect or test for errors by comparing the treatment of the same data in two or more channels. Comparisons are made at test nodes between reference "signatures" and actual "signatures" in normal operation or in test operation. Syndrome units are used to test or monitor circuits for protection against errors and for error correction. The monitoring and testing is done in a system which connects a microcomputer to test nodes of the equipment to be tested or monitored over a test bus.

19 Claims, 5 Drawing Sheets

TEST AND MONITORING SYSTEM FOR A DIGITAL VIDEO TAPE RECORDER/REPRODUCER

The invention concerns a system usable for testing or monitoring a magnetic tape recording and reproducing apparatus for recording or reproducing digital television signals on or from magnetic tape. More particularly the invention concerns such systems useful for video tape recordings which conform to the standards described in the following publications:

"Standard For Recording Digital Television Signals on Magnetic Tape and Casettes" of the European Broadcasting Union, Tech 3252-E commonly referred to as the D1 standard;

"Proposed American National Standard for Digital Video Recording," of the Society of Motion Pictures and Television Engineers (SMPTE) 224M to 228M, and (Periodical) Fernseh-und Kinotechnik 1987, Heft $\frac{1}{2}$, pages 15-22.

Especially because of the high data rate of 227 Mbits per second and the high recording density, the provision of protection against errors in recording and reproduction, by locating and marking errors, correcting them if possible and concealing them in other cases, is extremely expensive and complicated. The distribution of the recorded signals in sections of four channels over two or more tracks on a magnetic tape contributes to accomplishing improvement in the safety margin with respect to errors, but requires some further switching complication for that purpose.

Up to a certain error rate, a complete correction of the reproduced signals is possible. In a further range of the error rate, concealment of errors is possible, so that in observing the reproduced picture, the errors will be invisible or barely visible. Normally only the case of very poor signals read out from the tape shows up as notable deterioration of the reproduced pictures.

The circuits for reducing picture deterioration to a minimum are quite complex, however, so that defects in them are difficult to localize, especially since the errors arising thereby reveal themselves in a very great variety of ways. Thus, for example in the case of a defect in the circuit for forming check words for the recordings, the error correcting circuits used in reproduction of the recorded data respond by indicating the presence of uncorrectable erroneous data words, even though absolutely correct data words may have been recorded on the tape. This response is noticeable in a degree according to the gravity of the recording circuit defect.

SUMMARY OF THE INVENTION

It is an object of the present invention to provide a testing and monitoring system for videotape magnetic recording and reproducing equipment which will detect and identify defects in circuits of the system and in the functioning thereof.

Briefly, advantage is taken of the four identically built recording and reproducing channels for detecting and locating malfunctions when identical signals are processed in the several channels and then compared. The difficult problem of testing Reed-Solomon code encoders and decoders is solved by providing syndrome forming units, preferably in equipment to be tested, which will produce a zero output in cases of absence of error in coding and/or decoding. Test nodes connectable to a test computer through a bus system are used for controlling tests and reporting results and counters may be added to measure occurrence of uncorrectable errors and the like. The test system can also perform tests and/or monitoring in matters not peculiar to video-data recording and reproduction.

The system of the invention has the advantage that defects can be found both during an extensive monitoring run of the video tape equipment under observation and also in a self-test mode in which test signals are substituted for video data processed in the normal course of recording or reproduction on/or from tape. It is particularly advantageous in the self-test mode for the system of the invention to compare output signals of identical signal processing circuits arranged in parallel. The equipment to be tested normally includes four channels operated in parallel in order to reduce the bandwidth of the signals actually recorded. These can readily be supplied with identical signals for comparison tests.

It is also advantageous for the equipment to be tested or monitored to include circuits by which switching signals can put the equipment into a test mode of operation. Furthermore, it is useful for the equipment to be tested to have test nodes in individual functional groups of components for making available connections to a bus system to which a test computer is connected. Such arrangements also facilitate central control of a self-test operation of the equipment connected to the test or monitoring system.

Further details of the invention will best be understood in connection with a detailed description given further below.

BRIEF DESCRIPTION OF THE DRAWINGS

The invention is further described by way of illustrative example with reference to the annexed drawings, in which:

FIG. 2 is a block circuit diagram of the remainder of the equipment of which FIG. 1 shows a first portion;

The video tape equipment illustrated by the block circuit diagrams of FIGS. 1-4 is designed to operate according to the above-mentioned D1 standard described in the publications identified in the introduction of this specification. Reference is made to those publications regarding encoding, error protection and error concealment circuits as well as decoding schemes utilized in the equipment.

In the representative given in FIGS. 1, 2, 3 and 4, those circuits of the illustrated example which are provided on separate circuit boards and thereby combined with a group of components are outlined in broken lines. Each of these circuit board component groups is provided with a test node for connection in a manner illustrated in FIG. 5. The test nodes in FIGS. 1-4 are represented as double-bordered rectangles. In connection with FIG. 5, a few monitoring functions will be explained further below which are not specifically designed to fit characteristic of digital video recording.

With reference to FIGS. 1 to 4 however, arrangements and procedures will be described which are particularly suited for use in connection with digital video recording. Some of these measures are carried out during normal operation of the equipment under observation and others are put into use in a special self-test mode of operation of the equipment under observation. For differentiating the two kinds of operations just mentioned, the first kind are designated as "monitoring" and are shown in FIGS. 1 to 4 by simple broken line connections, whereas a self-test mode of operation is designated as "testing" or "test" and the related signal paths are shown by chain-dotted lines in FIGS. 1 to 4. In order to make the drawings more easily readible, where several identical channels are present in corresponding circuits, the identical channels not are provided with different numerals or symbols unless express reference made to these circuits so requires. A few connections to the test bus or to the test nodes, moreover, are only generally indicated rather than specifically shown.

Each test node is connected with a bus system 100 which is also referred to as a test bus in the following description. A test computer 114, connected to the test bus 100 (FIG. 1 and FIG. 5), can obtain information from the test nodes by interrogation over the test bus 100 as well as provide commands to the component group circuits to be tested through the test bus and the test nodes.

Figure 1:
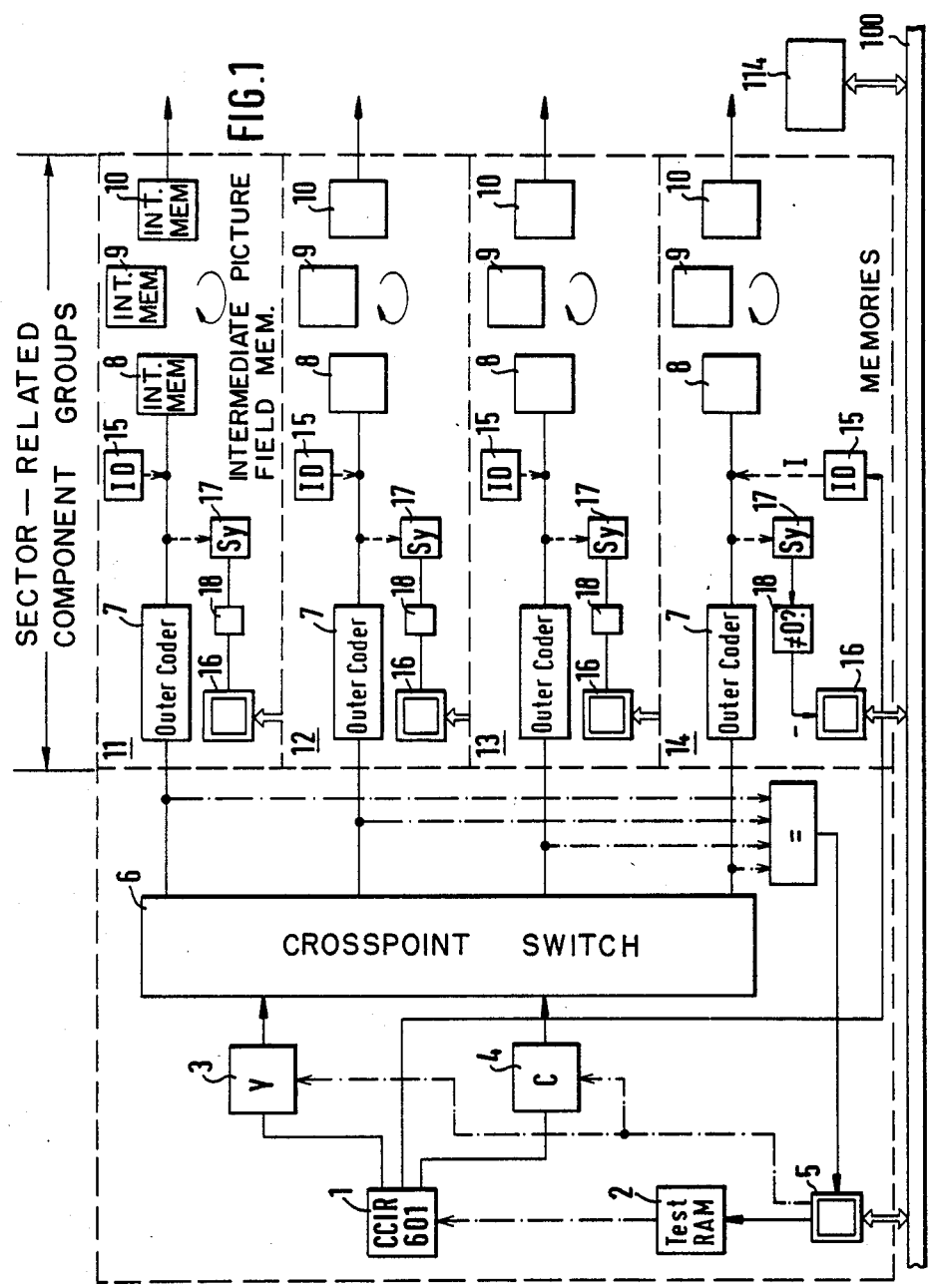
FIG. 1 is a block circuit diagram of a first portion of a digital video tape recording equipment having test nodes in accordance with the invention.

As shown in FIG. 1 an input interface unit 1 normally supplies standard digital television signals, for example according to the CCIR 601 standard. For test operation a test signal can be supplied (instead of normal provision of signals) from the output of a read/write random access memory (RAM) 2. For that purpose the RAM 2 receives control signals from test node 5. The luminance signal and the chrominance signal, whether of television signals or of a test signal, are respectively supplied to the circuit blocks 3 and 4 for the purpose of precoding. From these circuits the binary code provided in accordance to the CCIR 601 standard is converted into a code in which single bit errors which may arise during future recording and reproduction will result in defects of the smallest possible visibility on a picture screen. Details of this code are described in German Patent 32 33 956 and corresponding to U.S. patent application of J. HEITMANN, Ser. No. 532,443. For the self-test mode of operation, however, the use of the CCIR 601 Standard binary code is nevertheless more favorable. For this reason, a control signal can be supplied to the circuits 3 and 4 from the test node 5 as a result of which the above-described conversion to what may be called the "source" code can be switched off.

In accordance with the D1 standard, the video data to be recorded are distributed among four channels, referred to as sectors, on the magnetic tape. This distribution is performed by a crosspoint switch 6 with four outputs. In order to test the functioning of the crosspoint switch in the self-test mode of the equipment, a comparator 19 is connected to the outputs of the crosspoint switch. The test signal is so designed that with correct operation of the crosspoint switch 6 all its output signals are identical. If this is not the case, an error flag is produced at the test node 5 for the test computer 114.

At each of the outputs of the crosspoint switch 6 an encoder 7 commonly known as an "outer coder" is connected for further processing of the digital video signal. It will be observed here that identical components are provided with the same reference numerals when no particular distinction between the identical components is necessary for this description. In each of the outer coders 7, check signals are added to the video data in accordance with a Reed-Solomon code. Thereafter the shuffling of the video data is produced by the use of three intermediate memories 8, 9 and 10 for each sector, which are switched in cyclical sequence for writing in data and reading it out. Thus, for each sector there are provided a coder 7, the intermediate memories 8, 9 and 10 and a test node 16 connected within one of the component groups 11, 12, 13 and 14.

Figure 2:
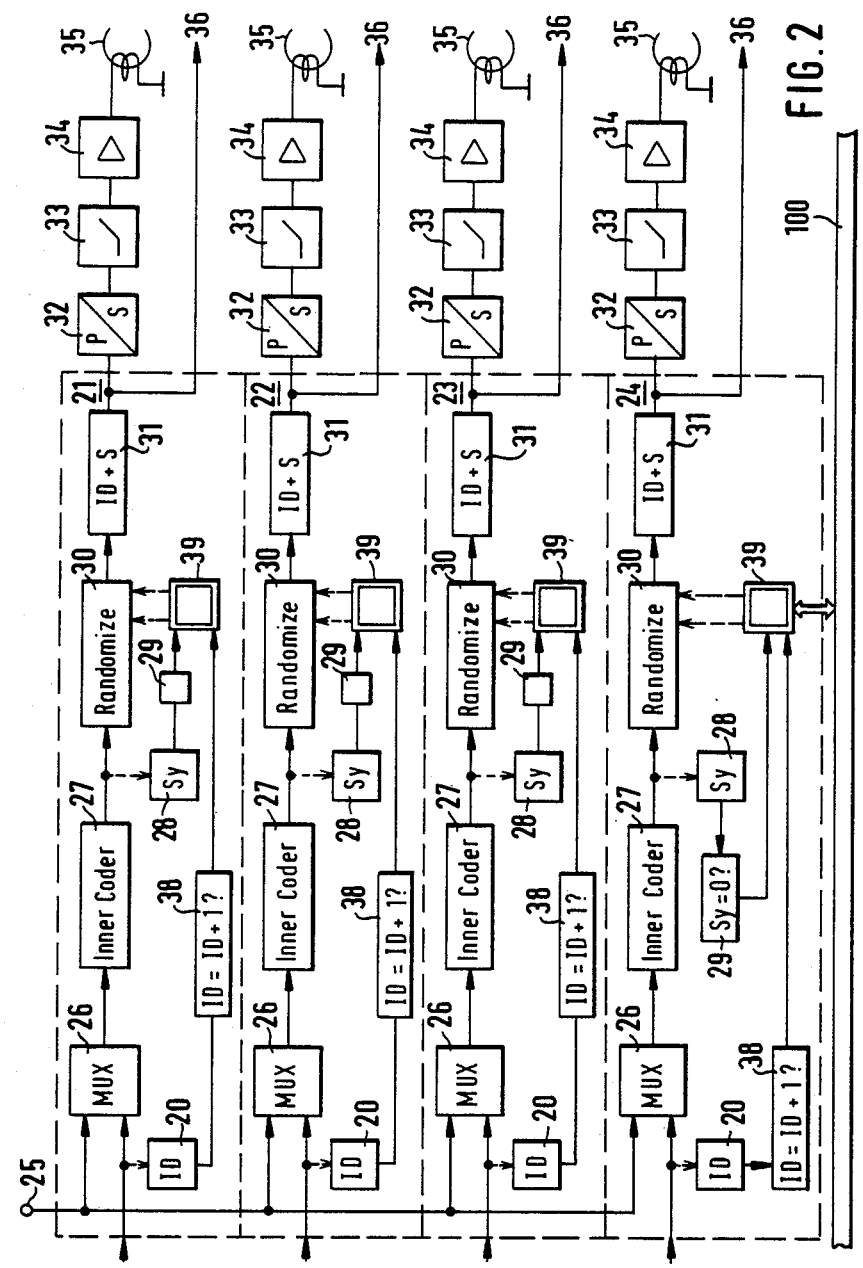

The function of the outer coder 7 is checked by a syndrome forming unit 17. As soon as the output syndrome differs from 0, an error flag is transmitted by the comparator circuit 18 to the test node 16. In accordance with the above-described standard, the video and audio data are recorded in individual blocks which suceed each other, each preceded by synchronizing signals. In order to be able to put the signals correctly back together again, these socalled sync blocks are also preceded with identification signals, which in addition to having a number of a running number sequence, designate the segment, the sector and the picture field to which the sync block belongs. These identification signals ID are derived from the supplied digital television signals in a circuit 15 in the illustrated embodiment of FIG. 1. Although the identification signals to be recorded are only later supplied to the video and audio data, for purposes of monitoring the component groups 11 and 14, identification signals are already inserted there. They are separated from the output signals of the component groups 11-14 and are tested respective circuits 20 (FIG. 2). A simple test for this purpose consists in checking in a circuit 38 whether from data block to data block that portion of the identification signals which are provided by a number in running sequence is raised by 1 from sync block to sync block.

Additional component groups 21, 22, 23 and 24 are shown in FIG. 2 which respectively follow the component groups 11 to 14 of FIG. 1 or further processing in the respective sectors. In these components groups 21-24, digital audio signals supplied at 25 are added to the video signals by way of the multiplexers 26. An "inner coder" 27 at the output of each multiplexer 26 has a function, which like that of the outer coder 7 of FIG. 1, is described in the publications cited at the beginning of the specification. For understanding the present invention, it needs only to be mentioned that in each of these inner coders 27, four check words generated in accordance with a Reed-Solomon code for every 60 video data or audio data 8-bit bytes. These bytes are each video words and "samples", but an audio sample requires $2\frac{1}{2}$ bytes although it might be convenient to treat every $\frac{1}{2}$ byte (for every full byte) of an audio sample as a "word".

In the case of an error in an inner coder 27 as the result of which a false check word is generated, the audio or video data provided with the false check word will be designated as erroneous in reproduction of the data, even when it was recorded on a tape and read out from it without error. In order to prevent the occurrence of such a situation, in the illustrated embodiment of the present system, at the output of the inner coders 27 the code blocks are used to form syndromes in a syndrome forming unit 28 such as are used for error correction in reproduction equipment, as shown for example in the copending application of R. Mester, Attorney, Docket No. 88162, claiming priority of the German Patent Application P 37 19 404.6 filed June 11, 1987. This checking takes place during normal operation of the digital video tape equipment.

In the circuit 30 quasi-random signals are superposed on the output signals of the inner coder 27 in such a way that the signals later recorded on magnetic tape will to a considerable extent be free of dc component. In order that the thus superposed quasi-ramdon signals may be removed in reproduction from the tape, identical random signals are used for sync blocks of the same identification. The superposition of the quasi-random signals can be switched off through the test nodes for test purposes. Furthermore, likewise under control by the test nodes, one or two bits of the quasi-random signal can be modified in order to simulate errors.

The outputs of the circuits 30 go to respective inputs of circuits 31. Each circuit 31 is provided for the insertion of the identification words and synchronizing words at the beginning of the sync blocks. The signals to be recorded proceed from each circuit 31 to a parallel-to-serial converter 32, a recording preemphasis circuit 33 for reducing distortion and a final recording stage 34 which delivers the signals to the recording head 35.

Details such as, for example, rotating parts and the arrangement of heads on the head wheel, are not shown, since they are not necessary for explanation of the invention and are generally well known.

An output 36 is provided for each of the circuit boards 21, 22, 23 and 24 for use in a socalled E—E test, in which recording and reproducing circuits are connected in tandem through a loop of tape.

Figure 3:
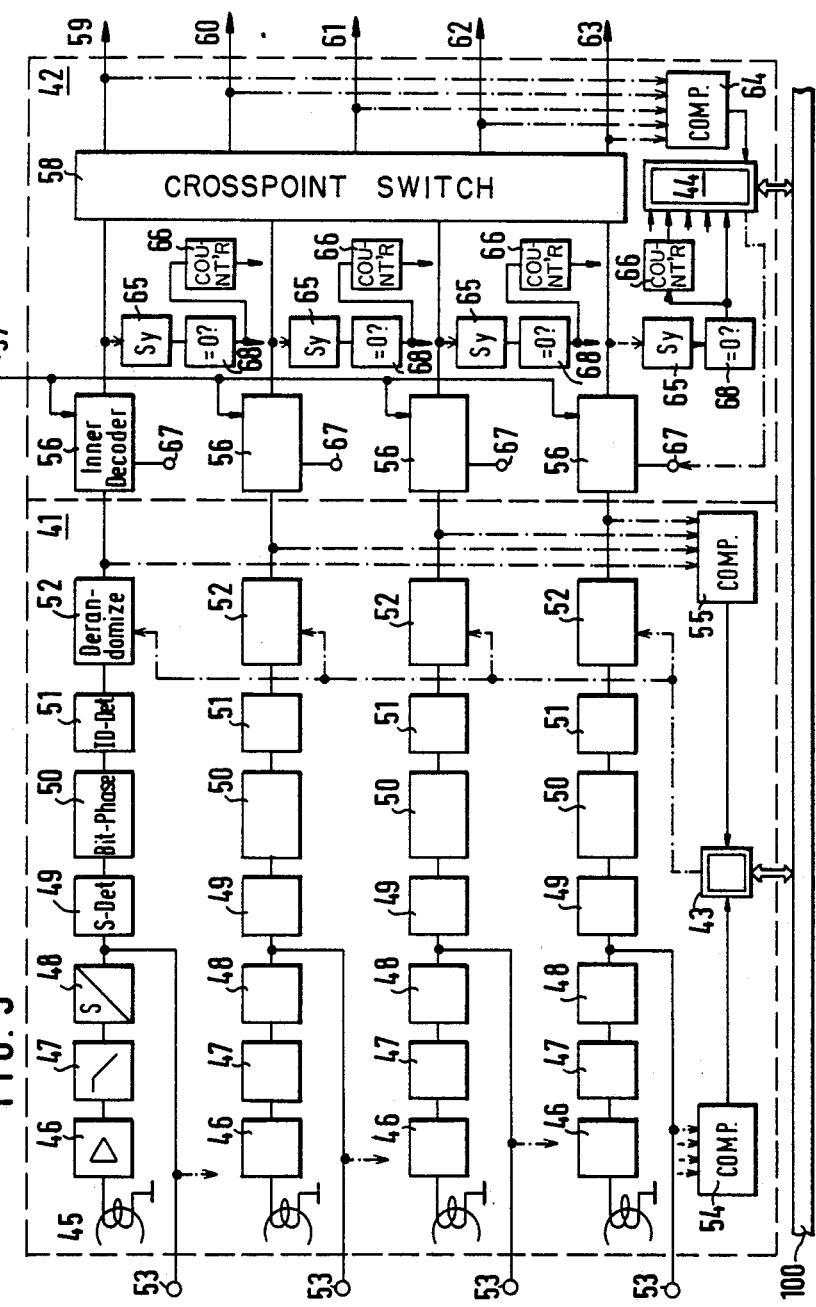
FIG. 3 is a block circuit diagram of a first portion of a video tape video reproducing equipment having test nodes in accordance with the invention.

The portion of the reproducing equipment shown in FIG. 3 comprises two component groups 41 and 42 with respective test nodes 43 and 44. The component group 41 contains four parallel channels, each with a reproduction magnetic head 45, a preamplifier 46, and de-emphasis circuit 47 for reducing distortion and a serial-to-parallel converter 48 which converts the serial data stream read out by the magnetic head into a parallel data stream. In this parallel data stream, no account is at first taken of the correspondence of the eight parallel binary places to a data word byte. That is taken care of after the detection of a synchronizing word in the detector 49, by reference to which a bit phase correction is performed in the circuit 50. The phase-corrected parallel data stream then proceeds to a circuit 51 for reading the identifical signals. After that the quasi-random signals superposed in recording are removed in a circuit 52.

For the above-mentioned E—E test, the parallel signals provided by the outputs 36 of the circuits shown in FIG. 2 can be supplied through the inputs 53 to the inputs of the detectors 49.

The signals at the inputs 53 can be compared with each other in a comparator 54. In this way the preceding circuits can be tested in the self-test mode of operation. Furthermore, the output signals of the circuits 42 can be compared in a comparator 55 in order to check the function of the circuits 49 to 52. In case of inequality in the test mode while the channels contain identical signals, an error flag is provided from the circuits 54 or 55 to the test node 43. The superposition and the removal of the quasi-random signal can be controlled from the corresponding test nodes so that operation in the self test mode can be performed with or without the superposed quasi-random signal.

In the component group circuit board 42, there is an inner decoder 56 for each of the four channels. In the inner decoders 56 errors can be recognized by syndrome formation and can be corrected so far as possible. Circuits for that purpose are well known. A particularly advantageous circuit for so doing is disclosed in the copending application of R. Mester, Attorney Docket 88162, claiming the priority of German Patent Application P 37 19 404.6 filed June 11, 1987. With that circuit, in addition to error correction, bit-synchronizing can also be accomplished. This is needed, because the clocking of the heretofore described reproducing circuits 48 to 52 is derived from the signals read out from the magnetic tape. The rhythm of those signals is subjected to fluctuations, however, and those are not the same for four channels. For this reason the clock signal CLK is supplied to the inner decoder 56 through an input 57.

A redistribution of the signal portions distributed among the individual magnetic heads is performed by the crosspoint switch 58. The four outputs 59, 60, 61 and 62 of the crosspoint switch 58 provide in each case the signal belonging to a single sector. In addition there is an output 63 for the audio signals. For the self-test mode operation, the outputs 59 to 63 are connected to the inputs of a comparator 64 which provides an error flag to the test node 44 when there is difference among the output signals of the crosspoint switch 58.

The inner decoders 56 can be monitored by providing each one of them with a syndrome forming unit 65 connected to the decoder output, in which a syndrome is formed which will be used in the case of an error correction in the inner decoder 56. If this syndrome is not equal to 0, it is determined that an uncorrectable error is present which is then notified to a test node by a comparator 68. In the case of the self-test mode of operation the inner decoder 56 can be tested when signals without and with predetermined errors are supplied.

The output signal of the comparator 68 is additionally supplied in each case to a counter 66, the content of which can be interrogated through the test nodes 44 (which are shown in FIG. 3 as a single combined test node). In this way, the frequency of the incorrectable errors can be monitored continuously during operation.

Correction by the inner decoders can be switched off in each case by a control input 67 so that errors can be simply determined to exist. This manner of operation can also be switched in from the test nodes 44. The syndrome forming units 65 then communicate all the errors that are determined to exist.

Figure 4:
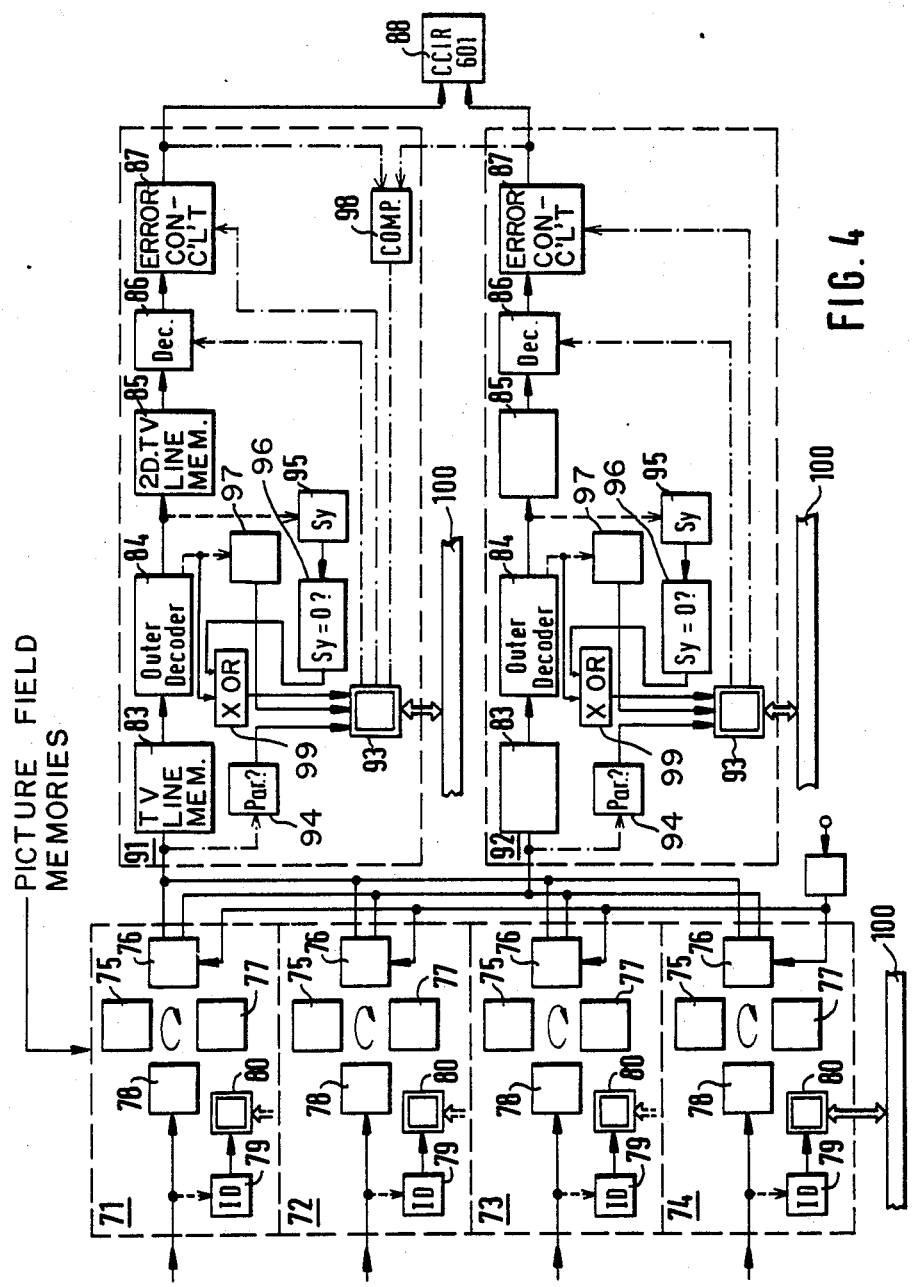
FIG. 4 is a block circuit diagram of the remainder of the equipment of which a first portion is shown in FIG. 3.

FIG. 4 shows the component groups on circuit cards 71, 72, 73 and 74, in which there are provided four picture field memories 75, 76, 77 and 78 for the respective sectors. These picture field memories are written in and read out in a cyclic pattern. Further details in the operation of such intermediate picture memories are to be found in the copending application of R. Mester, Attorney Docket 88163, claiming the priority of German Patent Application P 37 19 496.8 filed June 11, 1987.

In order to check whether the signals read out of the tape are correctly distributed among the sector circuit boards 71 to 74, the identification signals contained in the inputs signals of these component group circuits are separated. The sector information obtained therein is compared with the numbers of the sectors which the component group circuit 71 to 74 are respectively intended to serve. In the case of inequality, an error flag is provided by the comparison circuit 79 in question to one of the test nodes 80. By corresponding control of the read-out operations of the picture field memories 75 to 78 there appear respectively at the outputs 81 and 82 a digital luminance signal and a digital chrominance signal. These signals are supplied in each cae through a first television line memory 83, an outer decoder 84 and a second TV line memory 85. The line memories 83 and 85 serve for unshuffling the digital video signals while the outer decoder 84 performs a further error correction. Thereafter, the digital luminance signal Y and the digital chrominance signal C are each supplied to a source code decoder 86 to remove the effect of the recoding provided by the source coders 3 and 4 of FIG. 1.

At the output of the decoder 86, there is in each case a circuit 86 for error concealment. Error concealment circuits are explained in the copending application of J. Heitmann, Attorney Docket 88159, claiming the priority of German Patent Application P 37 19 405.4 filed June 11, 1987. The processed luminance and chrominance signal are then applied to an interface unit 88 satisfying CCIR 601 requirements, from which they can be taken elsewhere for further use. The component group circuits 91 and 92 each contain a test node 93. The inputs of these component group circuits are each connected to a parity check circuit 94 the output of which is connected to a test node 93. The test lines applied to the CCIR 601 interface unit 1 of FIG. 1 are so designed that at each of the circuit points 81 and 82 a prescribed parity exists which can be monitored by means of the circuit 94 during the test operation.

Following the outer decoder 84 there can be determined in each case by means of a further syndrome forming unit 95 and a comparison circuit 96 connected thereto, whether error free signals are present at the output of the outer decoder. This will then be likewise communicated to the node 93. Furthermore, another output of the outer decoder which provides a signal in the case of a presence of a uncorrectable error, a counter 97 is connected, the content of which can be interrogated through the test node 93 in each case. The output of the decoder 84 which goes to the counter 97 also goes to an exclusive-OR gate 99 interposed between the comparator 96 and the test node 93, so that the test node 93 will receive a signal from the gate 99 only when the inputs of that gate disagree.

For test purposes, the source code decoder 86 can be switched off through the test node 93. Furthermore, the output signals of the respective error concealment circuits 87 belonging respectively to the component groups 91 and 92 can be compared by means of a comparator 98. Since the test TV lines supplied are so designed that in an error-free operation of the described circuits, the signals at the outputs of the error concealment circuits 87 are the same, the further checking of the circuits is possible with this comparison. The output of the comparator 98 is connected with a corresponding input of the test node 93.

Figure 5:
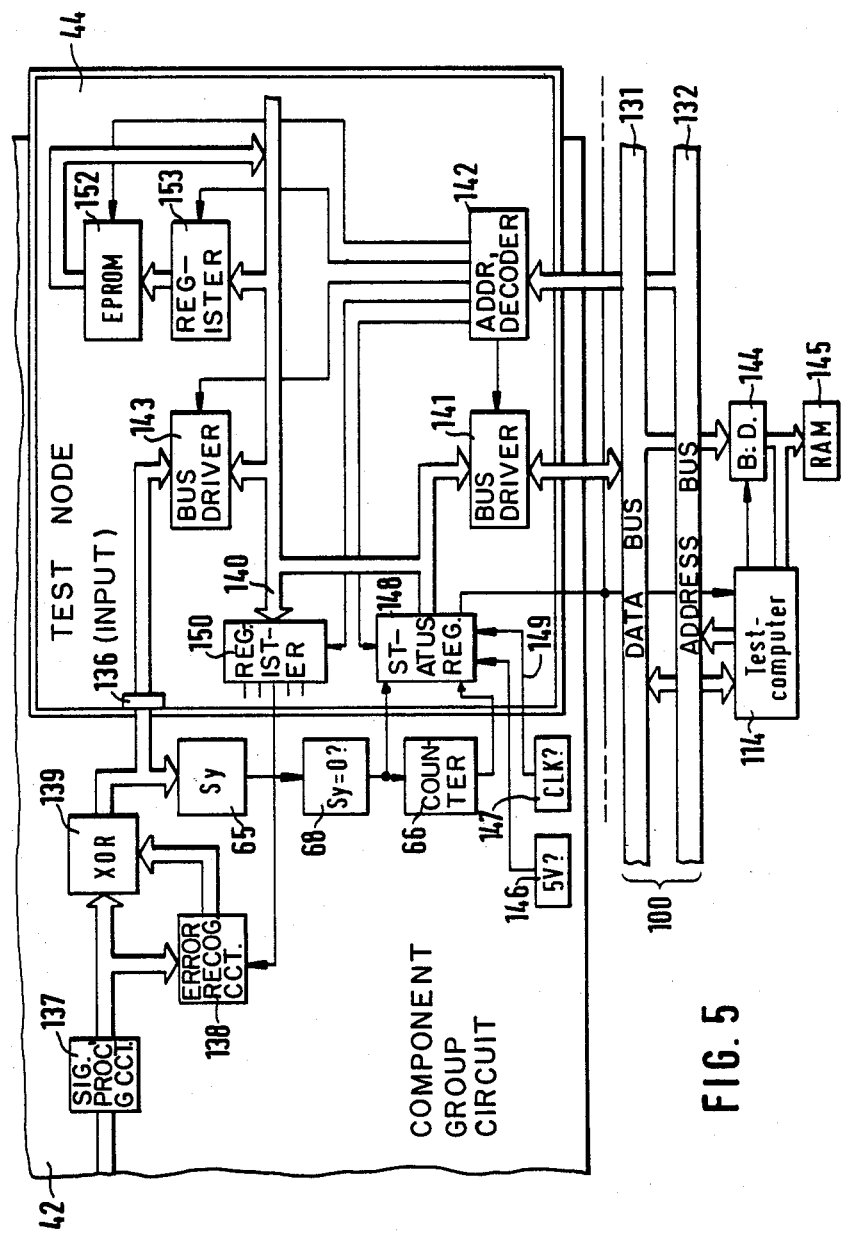
FIG. 5 is a block circuit diagram of components of a test system according to the invention connected to a test node of an equipment under test or monitoring.

In the illustrative embodiment of a test node shown in FIG. 5, the test bus 100 is subdivided into a data bus 131 and an address bus 132. The test node 44 is connected to a component group circuit 42 (FIG. 3) the outputs of which are connected to the input 136 of the test node 44 (FIG. 5) to illustrate in this example a portion of the component group 42 of FIG. 3 is shown in FIG. 5. In order to make clear the circuits described in connection with the component group 42 present only a part of what can be a quite extensive group of components, only a part of a circuit board is illustrated in FIG. 5.

The component group 42 includes among other elements a signal processing circuit 137, an error recognition circuit 138 and also an error correction circuit 139 constituted as an exclusive-OR circuit. A counter 66 is connected to the error recognition circuit.

A bus system 140 of the test node 44 can be connected with the data bus 131 by means of a bidirectional bus driver 141. The bidirectional busdriver is controlled by an address decoder 142 which is controlled by the test computer 114 by means of the address intended for the purpose, when the data bus 131 is to be connected with the bus system 140 through the bidirectional bus driver 141, i.e. when the test node 44 is to be connected to the test bus 100.

The signals supplied at the input 136 can be supplied to the test system. For that purpose, in addition to the bidirectional bus driver 141, the bus driver 143 is connected through. Since signals of very high data rates are processed by the component group 42, it is convenient for signals available only during short time intervals, first to write into a memory and then at slower speed to check them with the help of the test computer. For that purpose in the illustrated example of FIG. 5 a read-/write random access memory (RAM) 145 is connected to the data bus 131 through a bus driver 144. The bus driver 144 is switched through at the same time as the bus drivers 141 and 143, so that the prescribed time sequence of the signals to be tested can be written into the RAM 145.

The test computer can have access at slower speed to the data stored in the RAM 145 for checking out these data.

For monitoring during operation two sensors 146 and 147 are provided which furnish a signal when the operating voltage drifts out of a prescribed tolerance range or when the clock pulses CLK drop out. These sensors are connected with inputs of a status register 148 which can also be connected to other sensors. In the case of an error report or "flag" a data word will be written into the data register 148 designating the error. Furthermore, an interrupt signal is given to the test computer over the line 149, causing the test computer to interrogate the status register of the connected test node and thereby determine the location and nature of the error. Furthermore, the content of the counter 66 and a possible error report produced in the circuit 68 can also be read out through the register 148.

Another register 150 is connected by its inputs to the bus system 140, as a result of which it can receive control signal from the address decoder 142. Switching signals can be written into the register 150 by the test computer 114 in order to produce various modifications in the circuit of the component group 42. Thus the component group can be switched over from a normal operating mode into a test mode.

In the illustrated example according to FIG. 5, for example, for the test operation the output of correction signals from the error recognition circuits 138 or the error correcting circuit 139 can be interrupted by a switching signal supplied over the line 151, so that in a test operation the output signals of the signal processing circuit 137 can be tested without providing corrected errors.

In order to support testing of the component group 42 according to the well known "signature analysis method", an EPROM 152 and a register 153 are provided. Reference signatures of various test points of the component group 42 are stored in the EPROM 152. For testing, a test pattern is applied to the input of the component group with the help of a contact probe connected to the signature analysis system. In this procedure, the various points are prescribed by the signature analysis system for the test operator for example by indication on a picture screen-and then the corresponding reference signatures are called out of EPROM 152 and compared with the signatures reported through the test probe. The storage of the reference signatures in the test node has the advantage that in replacement of the component group the test node will likewise be replaced. In that way the result is obtained that the stored reference signatures always correspond to the level of development of the component group.

Commercially standard components are available for the bus drivers and registers. The status register 148 and the address decoder 142 can be readily provided by programmable array logic (PAL) circuits.

Although the invention has been described with reference to a particular illustrative example, it will be understood that modifications and variations are possible within the inventive concept.

What is claimed:

1. A system for monitoring a videotape recorder/reproducer having means for recording digital data in code blocks and having a plurality of channels each equipped with a plurality of Reed-Solomon encoders and a plurality of Reed-Solomon decoders, said system comprising:

a microcomputer (114) for monitoring said recorder/reproducer;

test bus means (100) for connecting said microcomputer to said recorder/reproducer;

a multiplicity of test node connection means in said recorder/reproducer each permanently connected to a different group of components of said recorder/reproducer, at least some of said groups of components respectively including said syndrome forming means, for connecting said groups of components of said recorder/reproducer to said test bus means (100);

a multiplicity of syndrome forming means (17, 28, 65, 95) respectively for each of said encoders and for each of said decoders connected respectively to said outputs of said encoders and decoders of said recorder/reproducer for producing syndrome values from data words and check words processed in said respective encoders and decoders;

a null detection comparator (16, 29, 68, 96) for each said syndrome forming means, said respective comparators being included in those of said respective groups of components in which said syndrome forming means are respectively included, each said comparator having an input connected to the output of the respective syndrome forming means and an output connected to a said test node connection means for providing an error flag signal whenever a syndrome value other than zero is provided at the output of said respective syndrome forming means;

means (2) for generating and applying a test signal simultaneously to each of said channels of said recorder/reproducer;

comparing means (19, 55, 64) in said recorder/reproducer for detecting equality or inequality of said test signal content among said channels, each said comparing means having an output to provide an error flag signal newly generated by the respective comparing means to said test bus means (100);

means in and associated with said microcomputer for registering the reporting each error flag signal and an indentification of a component group or component of said recorder/reproducer at which an error designated by a reported error flag signal was generated.

2. A system as defined in claim 1, wherein an exclusive-OR circuit is interposed between the output of each said comparator which is connected to a syndrome forming means operating on the output of a decoder and to a test node connection means through which said comparator is enabled to report to said microcomputer, for reporting an error flag signal produced by said comparator in the absence of an error flag signal from said decoder and vice versa.

3. A system as defined in claim 1, wherein at said outputs of said respective decoders of said recorder/reproducer, counters are respectively provided for counting the number of code blocks containing uncorrectable errors and means are provided for interrogation of each said counter by said microcomputer.

4. A system as defined in claim 1, wherein each of said pluralities of encoders includes an inner and an outer encoder and each of said pluralities of decoders includes an inner and an outer decoder, wherein said recorder/reproducer also includes an array of picture field memories each having an input connected to a said outer encoder, wherein means are provided for insertion of code block identification data in the output of each outer encoder of said recorder/reproducer and wherein means are provided for comparing, after readout from said picture field memories, said code block identification data with the last previous code block identification data read out from a said picture field memory for producing, said microcomputer, an error designation signal in the event said respective compared block identification data are not consecutively numbered.

5. A system as defined in claim 4, wherein means are provided for separating code block identification data from the input of each picture field memory, and for furnishing said code block identification data to said microcomputer for checking the correctness of the sequence of deshuffled code blocks utilized for video reproduction in said recorder/reproducer.

6. A system as defined in claim 1, wherein means are provided for inserting for recording, and removing from for reproduction, as said test signal, at least one test television line to be recorded with television signals and to be reproduced therewith only for providing monitoring information regarding said recorder/reproducer.

7. A system as defined in claim 6, wherein signals of said at least one test television line are so constituted and inserted, that a plurality of channels of similar characteristics within said recorder/reproducer will be processing the same signals contemporarily and wherein said test signal comparing means are connected for comparing corresponding signals respectively in said channels and reporting to said test computer any nonidentity of signals detected among said channels relating to said television line.

8. A system for testing a videotape recorder/reproducer having means for recording of video and audio television digital data in four channels after subdivision into four sectors which are shuffled by segments for recording in said four channels and more particularly having for each of said four channels an inner and an outer encoder and an inner and an outer decoder, said recorder/reproducer having first crosspoint switching means for signals to be recorded and second crosspoint switching means for signals to be reproduced, first picture field intermediate memory means interposed between each outer encoder and an inner encoder, second picture field intermediate memory means interposed between said second crosspoint switching means and each of said outer decoders, said system comprising:
  a microcomputer (114) for testing said recorder/reproducer;
  test bus means (100) for connecting said microcomputer to said recorder/reproducer;
  a multiplicity of test node connection means in said recorder/reproducer each permanently connected to a different group of components of said recorder/reproducer for connecting said groups of components of said recorder/reproducer to said test bus means;
  means under control of said microcomputer for generating and applying to an input of said recorder/-reproducer a test signal providing a plurality of test televisions lines of contents designed to provide identical signals contemporarily in each of said four channels and in each of said four sectors in said recorder/reproducer and thereby providing said identical signals contemporarily in said channels;
  comparing means in said recorder/reproducer for detecting equality or inequality of said provided identical signals among said channels and among said sectors and for communicating an error signal to said microcomputer via a said test node connection means and said test bus means in the event of nonequality detection, said comparing means including equality/nonequality detection means at the following stages of recording and reproducing:
    (a) at the inputs of said respective outer encoders,
    (b) at the inputs of said respective inner decoders, and
    (c) at the respective outputs of said second crosspoint switching means, and
  means in and associated with said microcomputer for registering each said error signal together with an identification of a said component group to which said respective error signal relates.

9. A system as defined in claim 8 wherein said recorder/reproducer includes randomizing and derandomizing means and wherein means are provided for disabling and reenabling said randomizing and derandomizing means by command of said microcomputer for test purposes.

10. A system as defined in claim 8, wherein parity check means are provided for checking parity of digital luminance and chrominance signals prior to their supply to respective outer decoders and means are provided for reporting results therefrom to said microcomputer.

11. A system as defined in claim 8, wherein at least one of said test node connection means is provided with a register into which data can be written in from said test bus and has inputs connected with control inputs of a component group associated with the respective test node connection means for switching said component group into operation in a test mode under control of said microcomputer.

12. A system as defined in claim 8, wherein means are provided for enabling said microcomputer to substitute, in a test mode of said recorder/reproducer, for quasi-random signals superposed on outputs of said inner coders of said recorder/reproducer and removed from inputs of said inner decoders of said recorder/reproducer, test signals which differ from said quasi-random signals by not more than two bits.

13. A system as defined in claim 8, wherein spread coders are provided in said recorder/reproducer respectively at the luminance and chrominance inputs of said first crosspoint switch and spread decoders are provided respectively at the luminance and chrominance outputs of said recorder/reproducer, and wherein means are provided, which are under control of said microcomputer, for switching off the respective functions of said spread coders and spread decoders during operation in a test mode of said recorder/reproducer.

14. A system as defined in claim 8 wherein means are provided for concealing uncorrectable errors of the output of said outer decoders for luminance and chrominance signals and means are provided for comparing with each other the error-concealed outputs of said concealing means respectively for luminance and chrominance for determining whether a degree of equality expectable from test signals is achieved and for reporting comparison results to said microcomputer.

15. A system as defined in claim 14, wherein means are provided for switching off the error-concealing functions of said means for concealing uncorrectable errors during a test mode of said recorder/reproducer under the control of said microcomputer.

16. A system as defined in claim 8, wherein test mode command means are provided whereby said microcomputer may put said recorder/reproducer into a test mode of operation wherein at least one signal processing circuit, of a kind similar to others in different channels or sectors of said recorder/reproducer, may be modified by said test mode command means to make said at least one signal processing circuit more exactly like said other signal processing circuits for better comparison of signals in said respective signal processing circuits.

17. A system as defined in claim 16, wherein one of said signal processing circuits is for processing of a digital luminance signal and another of said processing circuits of the same kind is a circuit for processing a digital chrominance signal.

18. A system as defined in claim 8, wherein at least some of said test node connection means contain registers the content of which may be called out through said test bus means by said microcomputer for storage or further processing.

19. A system as defined in claim 18, wherein at least one of said test node connection means having a register therein also has detectors for evaluating operating conditions of said recorder/reproducer and having outputs connected to inputs of said register.

* * * * *